July 21, 1936. H. S. NEWCOMER 2,048,284
VARIABLE FOCUS CORRECTING LENS
Filed Oct. 23, 1933
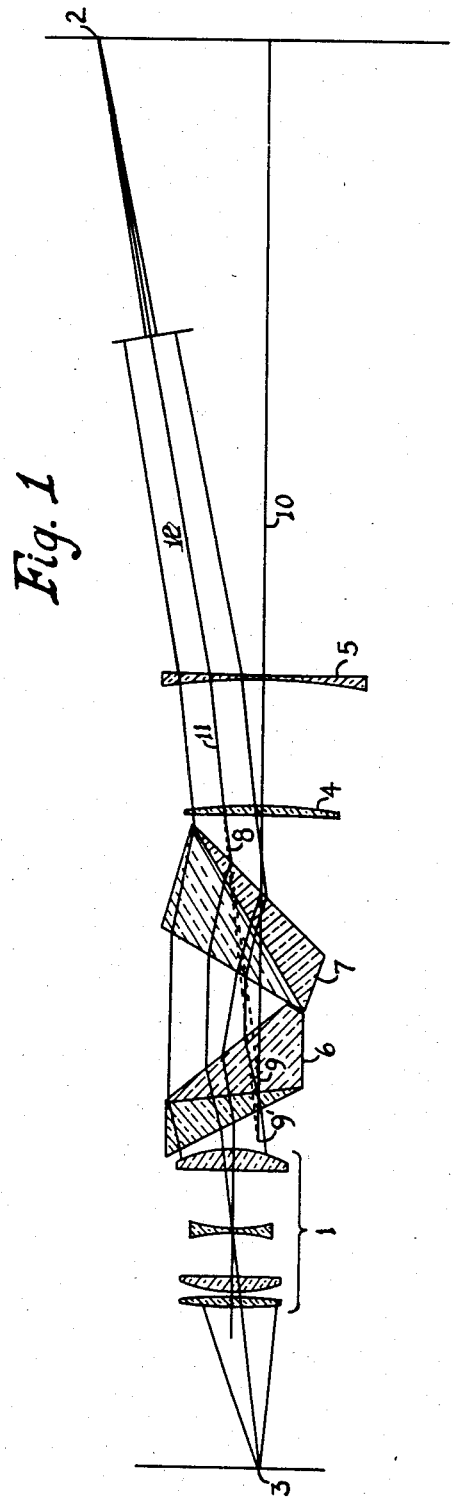
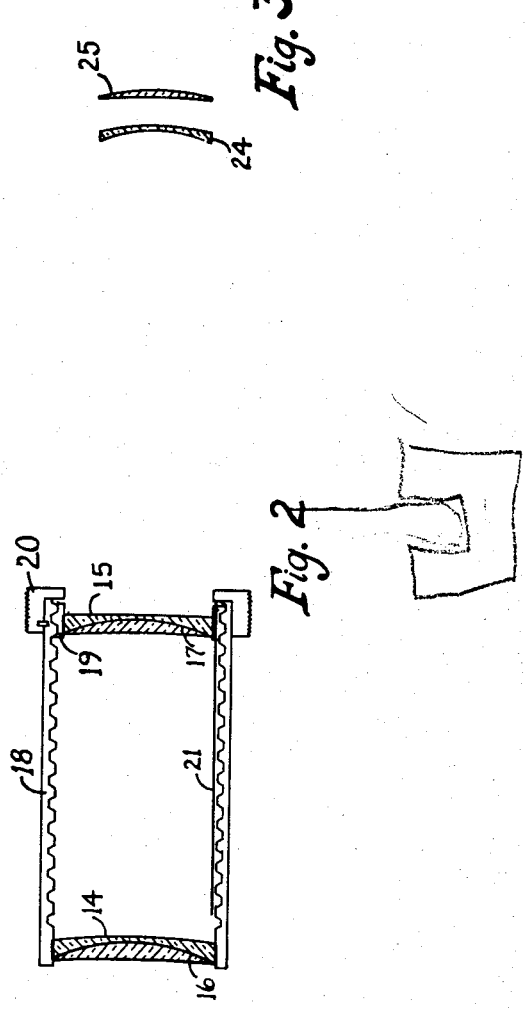
INVENTOR
Harry S. Newcomer
BY
Maurice B. Landers
ATTORNEY Patented July 21, 1936

2,048,284

UNITED STATES PATENT OFFICE 2,048,284

VARIABLE FOCUS CORRECTING LENS

Harry S. Newcomer, New York, N. Y.

Application October 23, 1933, Serial No. 694,802

19 Claims. (Cl. 88—24)

The invention relates to means for altering the convergence of pencils of light coming from an object and incident on an anamorphosing system, or other optical device, so that said pencils are incident parallel on the system and substantially free from astigmatism due to oblique incidence and to permit varying the convergence to conform to variation in the object (or projection) distance.

This application is a continuation in part of my copending applications for Letters Patent, Serial No. 382,681 filed August 1, 1929 and Serial No. 611,964 filed May 18, 1932, now Patents No. 1,931,992, and No. 1,932,082 both granted October 24, 1933. It represents in part certain improvements over the arrangements described in those applications.

It has heretofore been proposed to correct for object distances other than infinity with a parallelizing or collimating attachment consisting of two lenses, a fixed bi-concave lens and a movable bi-convex lens having equal curvatures.

In one aspect of the matter, this invention relates to improvements over the above proposal, and has for its object, to overcome certain defects therein, namely to overcome astigmatism introduced into oblique pencils by the above arrangement.

The ability to impress upon the anamorphoser or other optical device parallel pencils of light free from astigmatism due to oblique incidence on the correcting lens has been accomplished by the use of particularly formed correcting lenses as disclosed in the above mentioned patent.

The ability to impress upon the anamorphoser or other optical device parallel pencils of light free from astigmatism due to oblique incidence on the correcting lens and also to vary the strength of the correcting lens to conform to variations in object (or projection) distance is enhanced by the use of a correcting lens system comprising a positive and negative element, adjustable as to relative distance from one another, the positive element having its free surfaces concave toward the anamorphoser or other optical device, the negative element having its front surface appreciably flatter than its back surface, that is flatter than its surface facing the anamorphoser, or other optical device.

In a particular embodiment herein disclosed, I have used a fixed positive element positioned in front of and adjacent to the anamorphoser and having a back and front surface concave toward the anamorphoser, and of such front surface strength as is disclosed in my above last mentioned patent, thereby to overcome the introduction of astigmatism into oblique pencils by this positive element.

I combine with this positive element a negative element adjustably placed in front of it, of approximately the same absolute strength and having the front surface appreciably flatter than the back surface, thereby to overcome the introduction of astigmatism into oblique pencils by this negative element.

For further details of the invention reference may be made to the drawings wherein Figure 1 is a longitudinal section of a variable focus correcting lens system according to the invention together with an anamorphoser and ordinary spherical lens, thus indicating its use in association with such a device. Figure 2 is a schematic sectional view of an achromatic correcting lens system together with means for mounting the parts thereof so as to permit varying the focus of the correcting lens system by varying the distance between the elements thereof. Figure 3 is a longitudinal section of another embodiment of the invention.

Referring to the drawing 1 is a spherical lens imaging an object at infinity at the plane 3. At 4, 5, I show a spherical collimating or correcting lens system placed in front of an anamorphoser 6, 7, itself in front of the lens 1. The anamorphoser 6, 7, is shown sectioned parallel to its active plane. It is traversed by pencils of parallel light of which one such pencil is shown at 8. This pencil, considered as coming from a marginal point of the object 2 at finite distance and passing through the center of the aperture of the lens 1, would, if projected back from the spherical correcting lens element 4, intersect the axis 10 of the correcting lens element 4 in an intercept point 9 the distance of which from the element 4 I have called its "intercept distance". As stated on page 3 of the Patent No. 1,932,082 the intercept distance is at least as small as, and usually smaller than the distance between the collimating lens and the photographic lens 1. Consideration of relative opening and the geometrical requirements for space imposed by the configuration of the anamorphoser obviously make the distance between the two large when compared with the dimensions of the photographic lens. In the preferred example shown in Figure 1, the separation is shown as appreciably greater than the focal length of the lens 1, that is the lens 4 lies well outside of the first or front focal point of the lens 1.

The pencil 8, continued into the space between the two elements 4 and 5 is shown at 11 and has a different inclination to the axis 10. Therefore the intercept distance for the spherical lens element 5 is different than that for the lens element 4, not only because the intercept point 9' is differently located, but because of the different location of the element 5. Both features increase the distance when the negative element is disposed in front of the positive element.

If the intercept distance for the lens 4 be designated by the letter $p$ and the distance along the axis from the lens 4 to the intercept point of the pencil 11 be designated by the letter $q$, then if $f$ is the focal length of the lens 4 the following relationship determines the position of the new intercept point with respect to the lens 4.

$$\frac{1}{p} - \frac{1}{q} = \frac{1}{f}$$

The cambrure of the lens element 4 is chosen in the manner set forth in the second of the above mentioned patents as a function of its strength and its intercept distance, thereby to make the pencil 8 free of astigmatism so far as introduction of astigmatism by the element 4 is concerned. As therein disclosed, in making this choice, as a matter of convenience, and to simplify the problem, use is made of a "reduced" lens of intercept distance 25 millimeters. The strength of the reduced lens is to the strength of the lens element 4 as the intercept distance of the lens element 4 is to 25, both expressed in millimeters. Similarly for their front surfaces, which determine the cambrure.

As disclosed in the above last mentioned patent, the strength of the front surface of the lens 4 making the pencil 8 free of astigmatism due to refraction by the lens 4, is given graphically by a graph in which, when the strength of the front surface is plotted against the strength of the whole lens, both expressed in diopters, and in which when the dimensions of the lens are all reduced proportionally to the ratio of the true intercept distance to an intercept distance of 25 millimeters, then according as the thickness of the reduced lens is 1, 3, or 5 millimeters or a value proportionate thereto, the graph passes smoothly through the set of coordinate points (4.0, .01), (6.0, .2), (7.0, .45), (7.65, 1.0), (8.14, 2.0), (8.7, 4.0), (9.2, 6.0), (9.85, 8.0), (10.85, 10.0), (12.1, 12.0), (14, 13.8); or (4.0, .04), (6.0, .63), (7.0, 1.6) (7.74, 3.0), (8.1, 4.0), (8.73, 6.0), (95, 8.0), (10.6, 10.0), (12.03, 12); or (4.0, .10), (6.0, 1.18), (6.76, 2.0), (7.65, 4.0), (8.33, 6.0), (9.2, 8.0), (10.35, 10.0), (12.0, 12.0), (13.0, 12.7), (14.0, 13.1), (15.0, 13.15); or a set of points proportionate thereto respectively, wherein for each coordinate point the first figure within the parentheses represents the ordinate giving the strength of the front surface in diopters, and the second figure within the parentheses represents the abscissa giving the strength of the whole lens in diopters, both for the reduced lens.

The strength of the front surface of the reduced lens, as given by the above graph, approximates the algebraic sum of the number 8, the number designating one-fourth the strength of the reduced lens expressed in diopters, and the number resulting from the quotient of minus one times the thickness of the reduced lens expressed in millimeters divided by the strength of the reduced lens expressed in diopters.

The limitation expressed in the above last mentioned application, that 8 diopters was an upper limit within which useful reduced lenses might be found, does not here apply, the lens element 4 being for certain purposes stronger than lenses ordinarily used for the purposes of the above last mentioned patent.

The intercept distance for the lens element 5 may be calculated as indicated above from the intercept distance of the element 4, the strength of the element 4, and the distance between the two elements 4 and 5. The pencil 11 is by construction of the device, and because of the pencil 8 being parallel, a nonparallel pencil with a convergence as if it originated in a point in the anterior focal plane of the lens element 4, in other words as if the object were in this plane.

The criteria determining the anastigmatic form for the lens 4 do not therefore apply to the lens 5. In fact the lens 5, that is the front element of the variable focus correcting lens has a strength substantially corresponding to the convergence of the pencil 11, and its anastigmatic form is a function not only of its intercept distance, and of this convergence, but also of the convergence of the incident pencil due to the actual object distance. In the drawing the pencil 12 is a continuation of the pencil 11 on the front or the object side of the lens 5, and having a convergence as if originating in the object plane 2. The distance from the lens 5 to the object plane 2 may be called the object distance of the lens. For a reduced lens the object distance reduces in direct proportion to the ratio of the intercept distances.

If $D$ designates the strength in diopters of such a negative lens 5, $D_1$ the strength of its front surface, $n$ its index of refraction, $i$ its intercept distance and $j$ its object distance, both measured in meters and both positive in the illustrative examples, then the following is an expression relating these quantities.

$$\frac{D_1^2(n+2)}{n(n-1)^2} - D_1\left[\frac{2(n+1)}{n(n-1)}\left(\frac{1}{i}-D+\frac{1}{j}\right)+\right.$$
$$\left.\frac{D(2n+1)}{(n-1)^2}-\frac{4n+4}{n(n-1)j}\right]+$$
$$2\left(\frac{nD}{n-1}-\frac{2n+1}{nj}\right)\left(\frac{1}{i}-D+\frac{1}{j}\right)+$$
$$\left(\frac{n^2D^2}{(n-1)^2}-\frac{(3n+1)D}{(n-1)j}+\frac{3n+2}{nj^2}\right)+$$
$$\left(\frac{1}{i}-D+\frac{1}{j}\right)^2=0$$

For convenience of reference the above equation may hereinafter be referred to as the Newcomer anastigmatic convergence formula.

In order to simplify a consideration of this condition, we may, as was done in the above last mentioned patent, and without any loss of generality, arbitrarily fix the intercept distance as equal to 25 millimeters. It is also convenient to assume an index of refraction of 1.52. Subsequent variations in this index so as to make the problem more general have the same effect as disclosed in the above last mentioned application, namely they increase slightly the $D_1$ values over and above those given for $n=1.52$.

When plotted in rectangular coordinates $D$, $D_1$ this equation gives an ellipse lying diagonally in the coordinate plane and in general across the minus $D$ and plus $D_1$ axes. Unless the object distance be very small its lower limb cuts the $D_1$ axis between plus 5 and plus 9 diopters, and the $D$ axis at negative values greater than minus 8 diopters. Decrease in the object distance from infinity lowers the obliquely inclined lower limb of the curve from a position wholly above the D axis and tangent to it in the neighborhood of −20 diopters, so as to make it cut the D axis and the $D_1$ axis nearer and nearer to the origin, the displacement being substantially one of lateral translation of the entire limb downward toward the origin. Substantial increase in the value of $n$ raises the curve in its mid portion by increasing the size of the ellipse but keeping it tangent below to substantially the same horizontal and to the right of the $D_1$ axis to substantially the same vertical. The analytical values thus given are not greatly different from the values which would be obtained from trigonometric interpolation.

The actual strength which may be determined upon for the lens 4 will depend upon the dimensions of the associated optical device or anamorphoser, upon the most convenient separation allowable for the lenses 4 and 5, and upon the object distance range. The smaller the dimensions of the apparatus the stronger the lens 4 may be. The greater the minimum object distance, the weaker it may be. Assuming a minimum object distance of 2 meters, and a maximum object distance of infinity, then for an allowable separation of 125 millimeters, 2 diopters might be considered as an appropriate strength for the lens 4 and the lens 5 should be of substantially the same strength. When the two lenses are approximated so that they are substantially in contact the combination will have, or may be made to have by a slight alteration in the relative strengths of the lenses necessitated by their thicknesses, a zero strength corresponding to an infinite object distance. At a separation of 125 millimeters this strength will increase to ½ diopters. The strength of the variable correcting focus lens expressed in diopters, is equal to the algebraic sum of the strengths of its two components minus their algebraic product times the separating distance in meters.

If we choose 125 millimeters as the intercept distance of the lens 4 then an appropriate strength for the front surface of the lens 4 is from the above mentioned criteria, a fraction only more than 2 diopters.

The lens 5 has the strength of minus 2 diopters and an intercept distance equal to 167 millimeters plus the separation of the two lenses, an average figure for which is 63 millimeters. The intercept distance may therefore be taken as 230 millimeters. The strength of the front surface should therefore be about one ninth that given for a −18 diopter lens having 25 millimeters intercept. The minimum value of the object distance is fairly large, 2 meters, but the formula requires, in this instance, one ninth of this value to be used, namely 0.22 meter. Therefore the formula gives for the front surface of the appropriate −18 diopeter lens a strength of about −4.1 diopters. The reduced lens actually used has a front surface strength, in this instance, one ninth this or approximately minus one half diopter. The back surface would then be approximately −1.5 diopters, appreciably more curved. It should however be noted that at the intercept distance 230 millimeters the spacing is 63 millimeters, corresponding to a total strength of the correcting system of one quarter diopter or an object distance of 4 meters, reduced distance 4/9 meter. This gives a $D_1$ value for the −18 diopter lens of about −2 diopters, which reduced to the −2 diopter lens, becomes about −0.22 diopter.

At the minimum object distance the spacing is 125 millimeters and the intercept distance about 300 millimeters. The comparison or reduced lens is −24 diopters and the front surface strength is −7.3 diopters, one twelfth of which is −0.6 diopter.

The maximum object distance suggested for this example was infinity, namely $j=$infinity. For this the front surface of a −14 diopter lens would have a positive value of about plus 1.3 diopters and one seventh of it would be plus 0.2 diopter. It is thus apparent that a front surface strength of approximately −¼ diopter will substantially correct for astigmatism of oblique pencils over a considerable range of object distances this makes the front surface of the negative lens have one-seventh the curvature of the back surface.

The correct strength for the front surface of the negative element can therefore be chosen to give optimum correction for a designated range, being either slightly negative, or very slightly positive, but in any case nearly flat and, appreciably flatter than the back surface.

It will be noted that in the preferred example the front surface of the negative element of the collimating lens has substantially less than half the curvature of the back surface. For the positive element the reverse is true, the front surface has substantially more than twice the curvature of the back surface in fact many times the latter.

If by way of example the dimensions of the system were smaller, the intercept distance of the lens 4 being for instance 25 millimeters then this lens might have been made stronger as in the case of the positive lens 14 associated with the negative lens 15. For a strength of 4 diopters the front surface of the lens 14 would be approximately plus 8 diopters.

For the same object distance range the maximum separation of lenses 14 and 15 of such a correcting lens system would be 31 millimeters. The intercept distance of the lens 15 is therefore 28 millimeters plus a suitable portion of the 31 millimeter spacing. At 2 meters it is 59 millimeters. The reference lens is about −9½ diopters, the object distance is 0.84 meter and the front surface is about plus 2.28 diopters which reduced becomes about plus 0.96 diopter. At infinity the front surface of the reduced lens is about plus 6 diopters, at the mid-position it is about plus 4.15 diopters, equivalent respectively to plus 5.3 and plus 2.4 diopters. A suitable average is less easily chosen but the negative element has a front surface concave toward the anamorphoser or other associated optical device and flatter than the back surface. It would have less than half the curvature of the back surface. For the positive element the reverse is again true, the curvature of the front surface is twice that of the back surface.

In both the illustrative examples it is to be noted that maximum strength of the collimating lens is taken at 2 diopters, corresponding to an object distance of ½ meter. Focusing the collimating lens to this distance produces a considerable separation of the two elements with corresponding considerable change in the optical correction for the various focusing positions and that this is preferred to greater ranges which would result from the minimum object distance being less than this.

The negative and positive elements might have been interchanged as to relative position. Such an arrangement is shown in Figure 3 where the negative lens 24, —3 diopters, 50 mm. intercept, is shown as the back element and the positive lens 25, +3 diopters, is the front element. This appreciably increases the convexity of the front surfaces of both elements, making them relatively strongly positive. It also appreciably limits the range of strengths over which anastigmatic reference lenses exist, about —9 diopters for the negative lens and plus 9 diopters for the positive lens. The values for the positive lens are deduced from the formula above given for the negative lens in the manner described. The front surface values for the negative reference lens are approximately plus 9 to plus 11 diopters, increasing with the strength of the negative lens, particularly with high values thereof, and increasing above these figures with increase in $n$. Optimum anastigmatic adjustment may be obtained by trigonometric interpolation.

It is obvious that the spherical aberration of correcting lenses of this type is decreased by decreasing the strength of the elements used. It is small in any case because of the small aperture of any particular pencil.

Correcting lenses of the type described can be readily achromatized by forming them of two suitable glasses of different dispersive qualities. Such compound elements may be either cemented or uncemented. The cemented surfaces, or the air spaces, should preferably be concave toward the anamorphoser or other optical device so as to obviate the introduction of undue astigmatism at these surfaces. If both possible forms are concave backward then the one of maximum concavity is preferred.

Such an arrangement is shown at 16, 17, being respectively the cemented surfaces of the component lenses 14, 15 of the variable focus correcting lens. They are shown, each with the positive element of the achromatized doublet on the back or intercept side of the doublet, thereby causing the cemented surface to face with maximum concavity toward the anamorphoser or real image forming system with which the correcting lens may be associated.

The lenses 14 and 15 are shown in a mount 18 which should provide means for varying the distance between the two lenses in order to focus the correcting lens for different object distances. To this end the lens 14 may be rigidly attached to the mount and the lens 15 supported by a cell 19. Any convenient mechanical means can be provided whereby the cell 19 can be displaced backward and forward in the mount 18.

The foregoing particular description is illustrative merely and is not intended as defining the limits of the invention.

I claim:

1. An optical system for photographic or projection purposes comprising, in combination, a photographic lens, an anamorphosing unit in front of the photographic lens, and in front of the anamorphosing unit a variable focus collimating lens of such spacing, radii and indices of refraction as to cause pencils of rays both axial and oblique, to traverse the space between it and the photographic lens as pencils of substantially parallel rays, comprising a positive and negative element adjustably spaced with respect to each other, the positive element having its free surfaces concave toward the photographic lens and its front surface at least twice the curvature of its back surface, the negative element having its front surface substantially flatter than its back surface.

2. An optical system comprising, in combination, a real image forming system and in front thereof a variable focus collimating or correcting lens causing pencils of rays to enter the image forming system as pencils of parallel rays comprising a positive and negative element adjustably spaced with respect to each other, the positive element having its free surfaces concave toward the system, the negative element having its front surface appreciably flatter than its back surface, the positive element having a front surface with a strength in diopters approximating the product of the fraction, 25 divided by the intercept distance of the element expressed in millimeters, and the algebraic sum of the number 8, the number designating one-fourth the strength of a reduced element equal to the strength of the element expressed in diopters times the intercept distance over 25, and the number resulting from the quotient of minus one times the thickness of the reduced element expressed in millimeters divided by the strength of the reduced element expressed in diopters.

3. An optical system comprising, in combination, a real image forming system and in front thereof an achromatized variable focus collimating or correcting lens causing pencils of rays to enter the image forming system as pencils of parallel rays comprising a positive and negative element adjustably spaced with respect to each other, the positive element having its free surfaces concave toward the system, the negative element having its front surface appreciably flatter than its back surface, the positive element having a front surface with a strength in diopters approximating the product of the fraction, 25 divided by the intercept distance of the element expressed in millimeters, and the algebraic sum of the number 8, the number designating one-fourth the strength of a reduced element equal to the strength of the element expressed in diopters times the intercept distance over 25, and the number resulting from the quotient of minus one times the thickness of the reduced element expressed in millimeters divided by the strength of the reduced element expressed in diopters.

4. An optical system as in claim 3 in which the positive and negative elements are in each case achromatized doublets comprising a positive and negative component, the negative component being in front and the positive component behind.

5. An optical system as in claim 1 in which the negative element has its front surface with substantially less than half the curvature of its back surface.

6. A variable focus correcting lens comprising a positive and negative element adjustably spaced with respect to each other for use in combination with and in front of a real image forming system, causing pencils of rays to enter the image forming system as pencils of parallel rays the positive element having its free surfaces concave toward the system, the negative element having its front surface appreciably flatter than its back surface, the positive or back element having a front surface with a strength in diopters approximating the product of the fraction, 25 divided by the intercept distance of the element expressed in millimeters, and the algebraic sum of the number 8, the number designating one-fourth the strength of a reduced element equal to the strength of the element expressed in diopters times the intercept distance over 25, and the number resulting from the quotient of minus one times the thickness of the reduced element expressed in millimeters divided by the strength of the reduced element expressed in diopters.

7. A variable focus correcting lens as in claim 6 in which the negative element has the front surface strength given by the Newcomer anastigmatic convergence formula, substantially as described.

8. A variable focus correcting lens comprising a positive and negative element adjustably spaced with respect to each other, for use in combination with and in front of a real image forming system to cause pencils of rays to enter the image forming system as pencils of parallel rays the positive element having its free surfaces concave toward the system, the negative element having its front surface appreciably flatter than its back surface, in which the positive or back element has a strength expressed in diopters which is obtained graphically from a graph in which the strength of the front surface is plotted against the strength of the whole lens, both expressed in diopters, and in which when the dimensions of the lens are all reduced proportionally to the ratio of the true intercept distance to an intercept distance of 25 millimeters, then according as the thickness of the reduced lens is 1, 3, or 5 millimeters or a value proportionate thereto, the graph passes smoothly through the set of coordinate points (4.0, .01), (6.0, .2), (7.0, .45), (7.65, 1.0), (8.14, 2.0), (8.7, 4.0), (9.2, 6.0), (9.85, 8.0), (10.85, 10.0), (12.1, 12.0), (14, 13.8); or (4.0, .04), (6.0, .63), (7.0, 1.6), (7.74, 3.0), (8.1, 4.0), (8.73, 6.0), (9.5, 8.0), (10.6, 10.0), (12.03, 12); or (4.0, .10), (6.0, 1.18), (6.76, 2.0), (7.65, 4.0), (8.33, 6.0), (9.2, 8.0), (10.35, 10.0), (12.0, 12.0), (13.0, 12.7), (14.0, 13.1), (15.0, 13.15); or a set of points proportionate thereto respectively, wherein for each coordinate point the first figure within the parentheses represents the ordinate giving the strength of the front surface in diopters, and the second figure within the parentheses represents the abscissa giving the strength of the whole lens in diopters, both for the reduced lens, substantially as described.

9. A variable focus correcting lens as in claim 8 in which the mean index of refraction for the $d$ line of the glass of the positive element is approximately 1.52.

10. A variable focus correcting lens as in claim 8 in which the negative element has substantially the front surface strength given by the Newcomer anastigmatic convergence formula, substantially as described.

11. A variable focus correcting lens as in claim 8, mounted in front of an anamorphosing unit, thereby to reduce the astigmatism of oblique rays passing through the anamorphosing unit, substantially as described.

12. An optical system as in claim 1 in which the negative element has its front surface with substantially less than half the curvature of its back surface, the back surface of the collimating lens being separated from the front surface of the photographic lens by a space greater than the front focal distance of the photographic lens.

13. A variable focus correcting lens as in claim 1 in which the positive element is in front of the negative element and has substantially the front surface strength given by the Newcomer anastigmatic convergence formula, substantially as described.

14. A variable focus correcting lens as in claim 1 in which the negative element is back of the positive element and has a front surface strength approximating 9 to 11 diopters times the intercept distance of the element in millimeters divided by 25.

15. An optical system for photographic or projection purposes comprising, in combination, a photographic lens, and an anamorphosing unit in front of the photographic lens, and in front of the anamorphosing unit a variable focus collimating or correcting lens of a focal length to cause pencils of rays, both oblique and axial, to traverse the space between it and the photographic lens as pencils of substantially parallel rays, comprising a positive and negative element adjustably spaced with respect to each other, the negative element having its front surface with substantially less than half the curvature of its back surface, the surface of the variable focus collimating lens nearest the photographic lens being separated from the front surface thereof by a space greater than the front focal distance of the photographic lens.

16. An optical system for photographic or projection purposes comprising, in combination, a photographic lens, and an anamorphosing unit in front of the photographic lens, and in front of the anamorphosing unit a variable focus collimating or correcting lens of a focal length to cause pencils of rays, both oblique and axial, to enter the image forming system as pencils of substantially parallel rays, comprising a back positive and a front negative element adjustably spaced with respect to each other, the negative element having its front surface with substantially less than half the curvature of its back surface, the back surface of the positive element being separated from the front surface of the photographic lens by a space greater than the front focal distance of the photographic lens, the correcting lens having a strength of substantially less than one diopter so as to correct for greater object distances than one meter, substantially as described.

17. An optical system for photographic or projection purposes comprising, in combination, a photographic lens, an anamorphosing unit in front of the photographic lens, and in front of the anamorphosing unit a variable focus collimating or correcting lens of a focal length to cause pencils of rays, both oblique and axial, to enter the imagery forming system as pencils of substantially parallel rays, comprising a positive and negative element adjustably spaced with respect to each other, the positive element having its free surfaces concave toward the photographic lens and its front surface at least twice the curvature of its back surface, the back surface of the positive lens being separated from the front surface of the photographic lens by a space greater than the front focal distance of the photographic lens.

18. An optical system for photographic or projection purposes comprising, in combination, a photographic lens, an anamorphosing unit in front of the photographic lens, and in front of the anamorphosing unit a variable focus collimating or correcting lens of a focal length to cause pencils of rays, both oblique and axial, to enter the imagery forming system as pencils of substantially parallel rays, comprising a positive and negative element adjustably spaced with respect to each other, the positive element having its free surfaces concave toward the photographic lens and its front surface at least twice the curvature of its back surface, the correcting lens having a strength of substantially less than one diopter so as to correct for greater object distances than one meter, substantially as described.

19. An optical system for photographic or projection purposes comprising, in combination, a photographic lens, and an anamorphosing unit in front of the photographic lens, and in front of the anamorphosing unit a variable focus collimating or correcting lens of a focal length to cause pencils of rays, both oblique and axial, to traverse the space between it and the photographic lens as pencils of substantially parallel rays, comprising a positive and negative element adjustably spaced with respect to each other, the negative element having its front surface with substantially less than half the curvature of its back surface, the correcting lens having a strength of substantially less than one diopter so as to correct for greater object distance than one meter, substantially as described.

HARRY S. NEWCOMER.